US010630214B2

United States Patent
Wang

(10) Patent No.: US 10,630,214 B2
(45) Date of Patent: Apr. 21, 2020

(54) DC MOTOR CONTROLLER

(71) Applicant: HURD PRECISION CO., LTD., Douliu, Yunlin County (TW)

(72) Inventor: Feng-Ho Wang, Hsinchu (TW)

(73) Assignee: HURD PRECISION CO., LTD., Douliu (TW)

( * ) Notice: Subject to any disclaimer, the term of this patent is extended or adjusted under 35 U.S.C. 154(b) by 0 days.

(21) Appl. No.: 16/128,906

(22) Filed: Sep. 12, 2018

(65) Prior Publication Data

US 2020/0083825 A1    Mar. 12, 2020

(51) Int. Cl.
*G05F 3/02* (2006.01)
*H02P 7/28* (2016.01)
*H02P 6/16* (2016.01)
*H02P 29/024* (2016.01)
*H02P 6/28* (2016.01)

(52) U.S. Cl.
CPC ............ *H02P 7/28* (2013.01); *H02P 6/16* (2013.01); *H02P 6/28* (2016.02); *H02P 29/027* (2013.01)

(58) Field of Classification Search
CPC .. H02P 7/28; H02P 6/16; H02P 29/027; H02P 6/28
See application file for complete search history.

(56) References Cited

U.S. PATENT DOCUMENTS

| | | | |
|---|---|---|---|
| 3,916,276 A * | 10/1975 | Ottoson | H02P 3/12 318/269 |
| 4,065,804 A * | 12/1977 | Rostad | H02H 7/0833 361/96 |
| 4,710,685 A * | 12/1987 | Lehnhoff | H02H 9/047 318/286 |
| 5,977,732 A | 11/1999 | Matsumoto | |
| 9,231,453 B2 | 1/2016 | Abe et al. | |
| 2003/0057916 A1 * | 3/2003 | Davis | H02P 7/2815 318/800 |
| 2014/0028159 A1 * | 1/2014 | Abe | F16K 31/042 310/68 A |

FOREIGN PATENT DOCUMENTS

| | | |
|---|---|---|
| TW | 539360 | 6/2003 |
| TW | 201208244 A | 2/2012 |
| WO | WO 2005/112247 A2 | 11/2005 |

OTHER PUBLICATIONS

Taiwanese Search Report for Taiwanese Application No. 107118318, dated Jan. 2, 2019, with an English translation.

* cited by examiner

*Primary Examiner* — Muhammad S Islam
(74) *Attorney, Agent, or Firm* — Birch, Stewart, Kolasch & Birch, LLP

(57) ABSTRACT

A direct current (DC) motor controller includes first and second electrode terminals, a motor switch and a control unit. The first and second electrode terminals are connected to a DC electric power source, and cooperatively conduct DC electric current therefrom to the DC motor. The motor switch has first and second terminals. The first terminal is connected to a DC motor. The second terminal is connected to the second electrode terminal. The motor switch is switchable between a first state and a second state. The control unit is connected between the first and second electrode terminals, and controls the motor switch to switch between the first and second states.

9 Claims, 4 Drawing Sheets

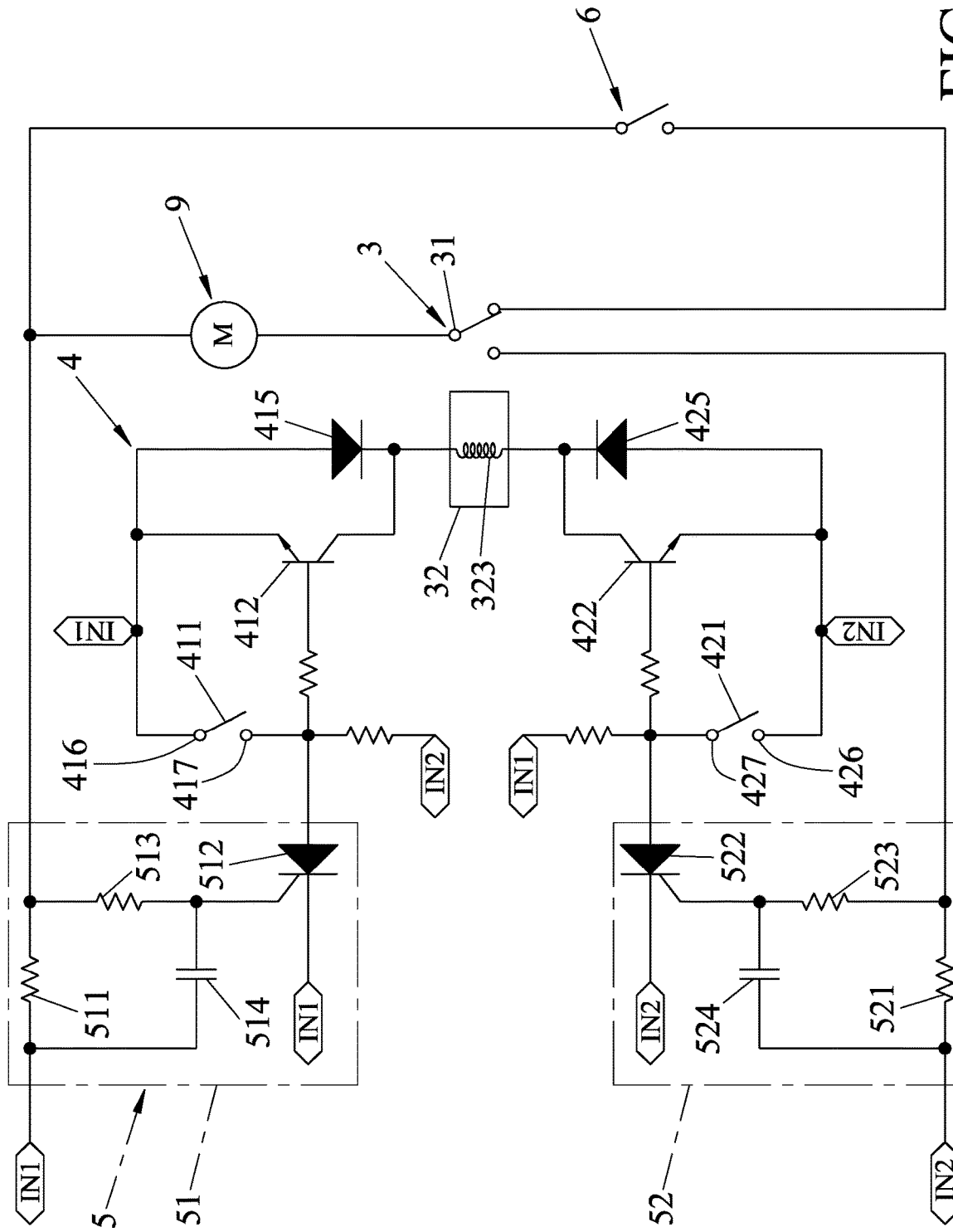

US 10,630,214 B2

DC MOTOR CONTROLLER

FIELD

The disclosure relates to a controller, and more particularly to a direct current (DC) motor controller.

BACKGROUND

A conventional direct current (DC) motor controller adapted to control a DC motor 19 is illustrated in FIG. 1. The DC motor controller has a first terminal 11 and a second terminal 12, and includes an upper limit switch 13, a lower limit switch 14, an upper diode 15 and a lower diode 16. The DC motor 19 is utilized to drive rotation of a screw rod (not shown) which urges linear movement of a nut (not shown).

The first terminal 11 and the second terminal 12 are configured to be connected to a polarity-switchable DC electric power source. For a positive configuration of the polarity-switchable DC electric power source where an electric potential applied to the first terminal 11 is higher than that applied to the second terminal 12, an electric current flows from the first terminal 11, through the DC motor 19, the upper limit switch 13 and the lower limit switch 14, and to the second terminal 12, in the given order. For a negative configuration of the polarity-switchable DC electric power source where the electric potential applied to the first terminal 11 is lower than that applied to the second terminal 12, the electric current flows in an opposite direction. By switching the polarity-switchable DC electric power source between the positive and negative configurations, the DC motor 19 is driven to operate in opposite directions to control the nut to move up and down along the screw rod. When the nut is moved up to an upper limit position where the upper limit switch 13 is triggered to an open state, the electric current is only allowed to flow in a direction from the second terminal 12, through the lower limit switch 14, the upper diode 15 and the DC motor 19, and to the first terminal 11. That is to say, the DC motor 19 is only allowed to be operated to control the nut to move down. Likewise, when the nut is moved down to a lower limit position where the lower limit switch 14 is triggered to an open state, the electric current is only allowed to flow in a direction from the first terminal 11, through the DC motor 19, the upper limit switch 13 and the lower diode 16, and to the second terminal 12, and therefore the DC motor 19 is only allowed to be operated to control the nut to move up.

However, since the upper limit switch 13, the lower limit switch 14, the upper diode 15 and the lower diode 16 are subjected to a high electric current flowing through the motor 19, large-sized devices that can bear the high electric current are required to implement the aforementioned components. Consequently, reduction in the physical size of the conventional DC motor controller is difficult to realize.

SUMMARY

Therefore, an object of the disclosure is to provide a direct current (DC) motor controller that can alleviate at least one of the drawbacks of the prior art.

According to the disclosure, the DC motor controller is adapted to control a DC motor. The DC motor controller includes a first electrode terminal, a second electrode terminal, a motor switch unit and a control unit. The first electrode terminal and the second electrode terminal are configured to be connected to a DC electric power source, and to cooperatively conduct DC electric current from the DC electric power source to the DC motor. The motor switch unit includes a motor switch. The motor switch has a first terminal and a second terminal. The first terminal is configured to be connected to the DC motor. The second terminal is connected to the second electrode terminal. The motor switch is configured to be switchable between a first state where the DC electric current is conducted to the DC motor for operation of the DC motor, and a second state where the DC electric current is not conducted to the DC motor. The control unit is electrically connected between the first electrode terminal and the second electrode terminal, and is configured to control the motor switch unit by operating the motor switch of the motor switch unit to switch between the first state and the second state.

BRIEF DESCRIPTION OF THE DRAWINGS

Other features and advantages of the disclosure will become apparent in the following detailed description of the embodiments with reference to the accompanying drawings, of which:

FIG. 4 is a circuit diagram illustrating a third embodiment of the DC motor controller according to the disclosure.

DETAILED DESCRIPTION

Figure 1:
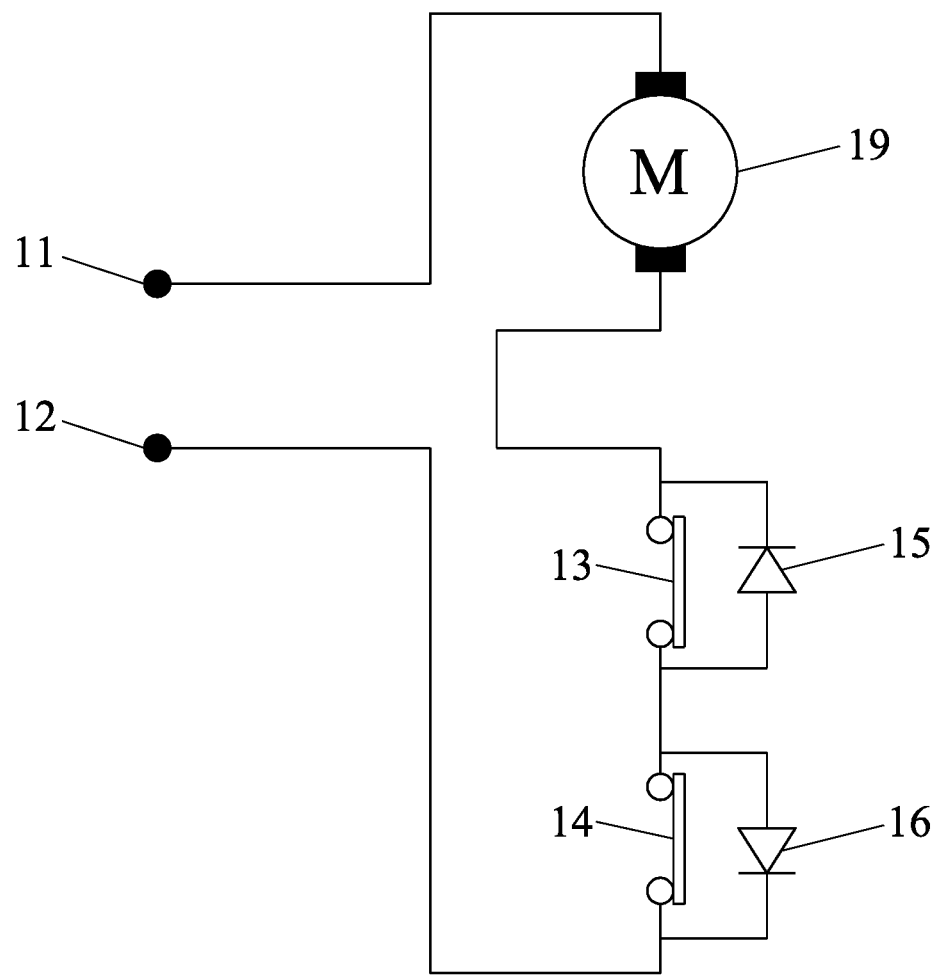
FIG. 1 is a circuit diagram illustrating a conventional direct current (DC) motor controller.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
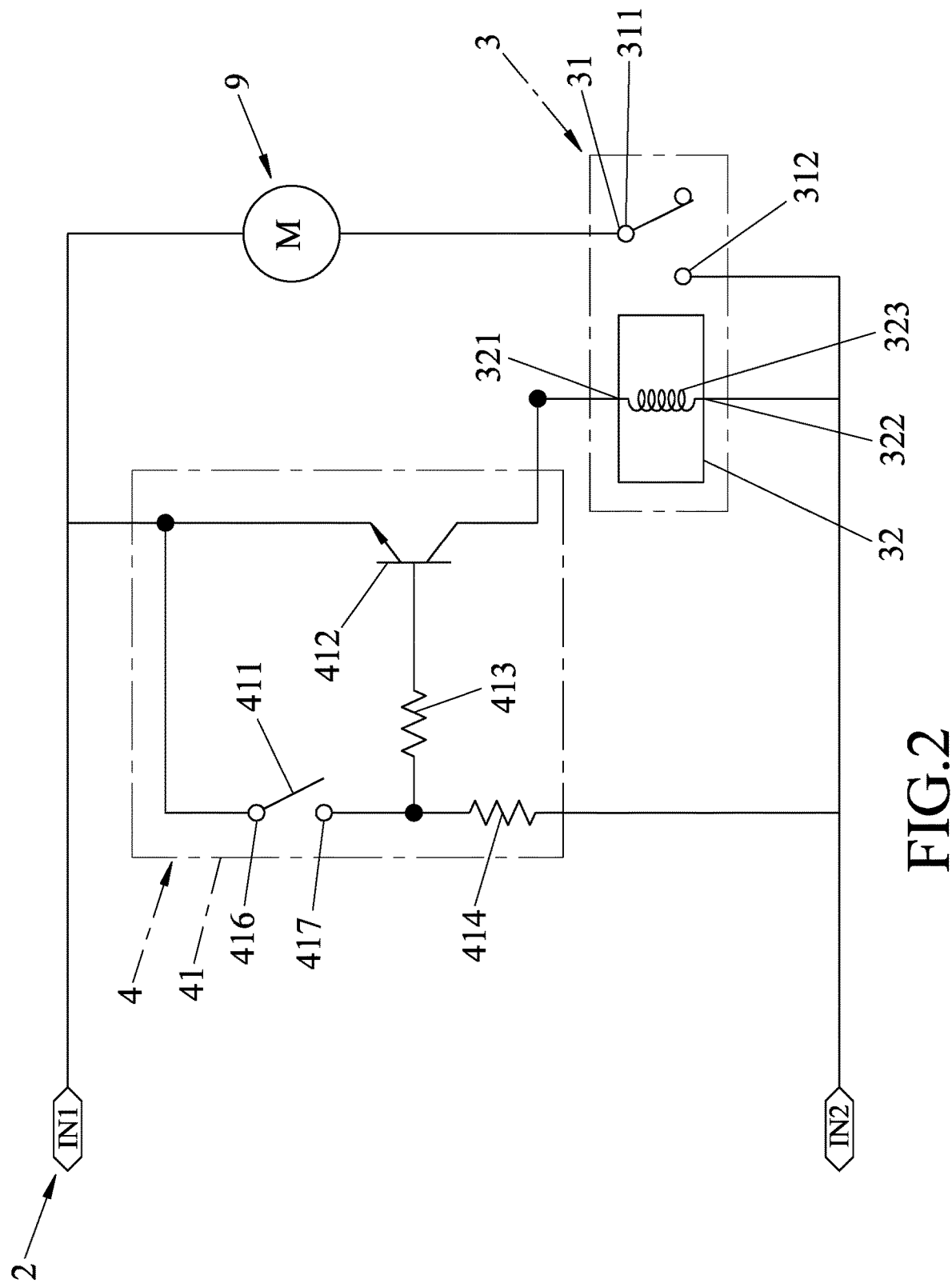
FIG. 2 is a circuit diagram illustrating a first embodiment of a DC motor controller according to the disclosure.

Referring to FIG. 2, a first embodiment of a direct current (DC) motor controller is adapted to control a DC motor 9 of an electric cylinder (not shown). The DC motor controller has a first electrode terminal (IN1) and a second electrode terminal (IN2), and includes a motor switch unit 3 and a control unit 4.

The first electrode terminal (IN1) and the second electrode terminal (IN2) are configured to be connected to a DC electric power source (not shown), and to cooperatively conduct DC electric current from the DC electric power source to the DC motor 9. In normal use, the polarity of the DC electric power source is fixed in a manner that the first electrode terminal (IN1) is kept at a lower electric potential (negative pole), and the second electrode terminal (IN2) is kept at a higher electric potential (positive pole).

In this embodiment, the motor switch unit 3 is implemented by, but is not limited to, a relay switch. The motor switch unit 3 includes a motor switch 31 and a switch driver 32. The motor switch 31 has a first terminal 311 to be connected to the DC motor 9, and a second terminal 312 connected to the second electrode terminal (IN2). The motor switch 31 is configured to be switchable between a first state where the first terminal 311 and the second terminal 312 are electrically connected so the DC electric current is conducted to the DC motor 9 for operation of the DC motor 9, and a second state where the first terminal 311 and the second terminal 312 are disconnected so the DC electric current is not conducted to the DC motor 9. The switch driver 32 has a first terminal 321 and a second terminal 322 which is connected to the second electrode terminal (IN2). The switch driver 32 includes an inductor 323.

The control unit 4 is electrically connected between the first electrode terminal (IN1) and the second electrode terminal (IN2), and is configured to control the motor switch unit 3 by operating the motor switch 31 of the motor switch unit 3 to switch between the first state and the second state. The control unit 4 includes a control module 41. The control module 41 includes a control transistor 412, a control switch 411, a buffer resistor 413 and a dropping resistor 414.

The control transistor 412 has a first terminal connected to the first terminal 321 of the switch driver 32, a second terminal connected to the first electrode terminal (IN1), and a control terminal connected to the second electrode terminal (IN2). In this embodiment, the control transistor 412 is implemented by an NPN-type bipolar junction transistor (BJT), wherein the first terminal corresponds to the collector of BJT, the second terminal corresponds to the emitter of BJT, and the control terminal corresponds to the base of BJT. However, implementation of the control transistor 412 is not limited to what is disclosed herein and may vary in other embodiments. For example, the control transistor 412 may be implemented by one of a PNP-type BJT, an N-type Metal-Oxide-Semiconductor Field-Effect Transistor (MOSFET) and a P-type MOSFET, and the wiring of the DC motor controller is adjusted based on the implementation of the control transistor 412.

The control switch 411 has a first terminal 416 electrically connected to the second terminal of the control transistor 412, and a second terminal 417 electrically connected to the control terminal of the control transistor 412. The control switch 411 is configured to be switchable between an open state and a closed state so as to control the control transistor 412 to operate in one of a conduction mode where the motor switch 31 is triggered by the switch driver 32 to switch to the first state, and a non-conduction mode where the motor switch 31 is triggered by the switch driver 32 to switch to the second state. Specifically speaking, when the control switch 411 is in the open state so that the electric potential of the control terminal of the control transistor 412 is higher than that of the second terminal of the control transistor 412, the control transistor 412 is in the conduction mode and allows an electric current to flow through the inductor 323, so that the motor switch 31 is switched to the first state to conduct the DC electric current to the DC motor 9 for actuating the DC motor 9 to drive the electric cylinder. On the other hand, when the control switch 411 is switched to the closed state, which may be controlled by an external control circuit (not shown) or may be caused by a trigger of the electric cylinder, the control transistor 412 is in the non-conduction mode and no electric current is conducted to flow through the inductor 323, so that the motor switch 31 is switched to the second state to stop conducting the DC electric current to the DC motor 9. Therefore, the DC motor 9 stops driving the electric cylinder.

The control switch 411 may be implemented by a limit switch such as a micro limit switch, a reed limit switch, an optoelectronic limit switch, a thermal limit switch or a vibration limit switch, but implementation of the control switch 411 is not limited to what are disclosed herein and may vary in other embodiments. The control switch 411 may be controlled by the external control circuit as well. The external control circuit controls the control switch 411 to switch between the open state and the closed state depending on results of determination as to whether the operating temperature of the DC motor controller is too high, whether the operating temperature of the DC motor 9 is too high, and/or whether the vibration caused by the DC motor 9 is too large.

The buffer resistor 413 is electrically connected between the second electrode terminal (IN2) and the control terminal of the control transistor 412. The dropping resistor 414 is electrically connected between the second electrode terminal (IN2) and the buffer resistor 413. The buffer resistor 413 and the dropping resistor 414 are configured to cooperatively protect the control transistor 412 by means of voltage reduction.

Because the control unit 4 and the DC motor 9 are no longer connected in series as with the prior art, a high electric current flowing through the DC motor 9 does not flow through the control unit 4, so the control unit 4 does not have to be implemented by large-sized devices forbearing the high electric current. Moreover, only a small amount of electric current is required to flow through the control unit 4 for controlling the motor switch unit 3, so the control unit 4 may be implemented by small-sized devices, greatly reducing the overall size of the DC motor controller. In practice, the size of the DC motor controller implemented based on the disclosure is small enough to be disposed in the electric cylinder.

Figure 3:
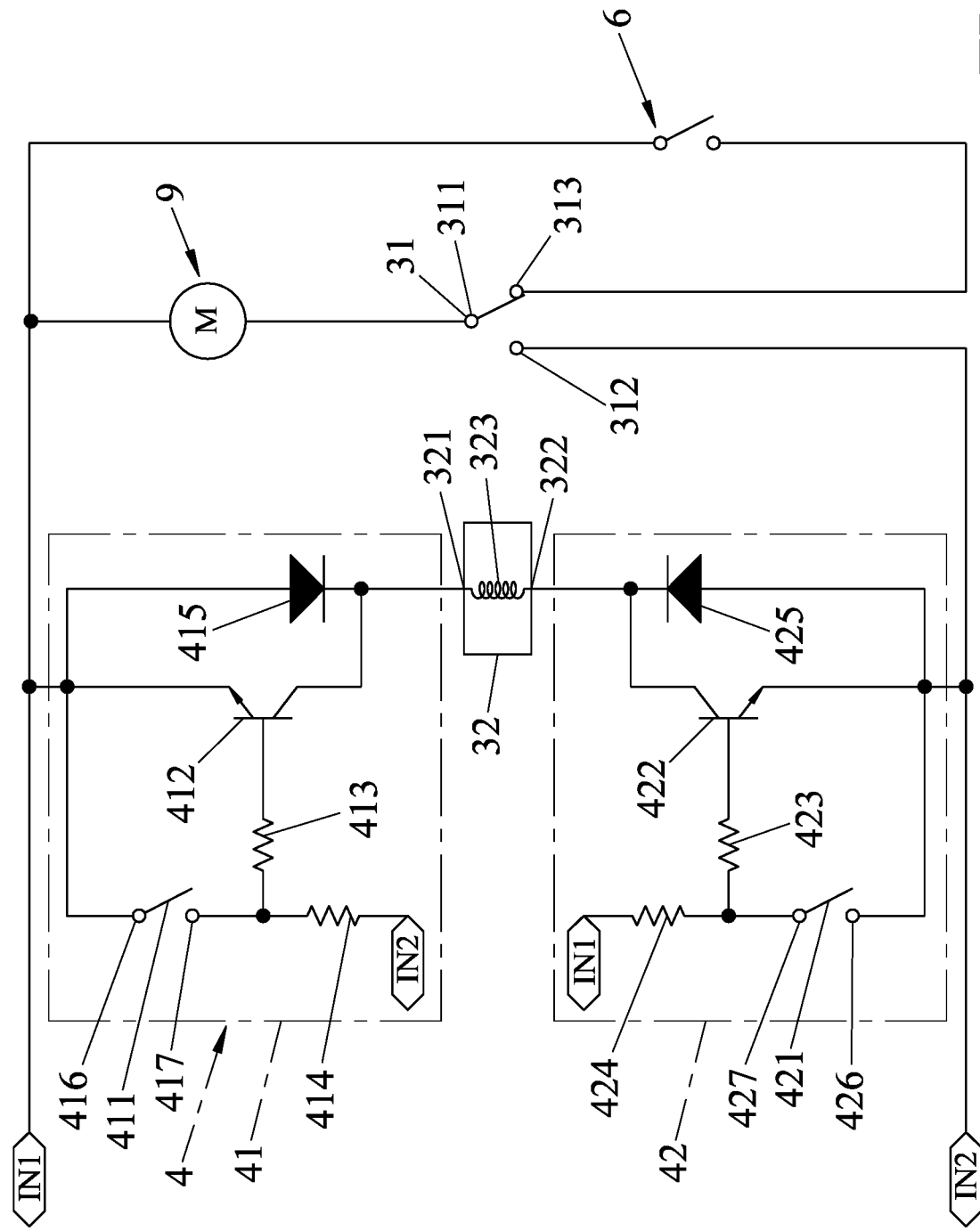
FIG. 3 is a circuit diagram illustrating a second embodiment of the DC motor controller according to the disclosure.

Referring to FIG. 3, a second embodiment of the DC motor controller is illustrated. The second embodiment is similar to the first embodiment of the DC motor controller, but is different in what are disclosed as follows.

The motor switch 31 of the second embodiment further has a third terminal 313, and is configured to, when the motor switch 31 is in the first state driven by the switch device 32, establish an electrical connection between the first terminal 311 and the second terminal 312, and to, when the motor switch 31 is in the second state driven by the switch device 32, establish an electrical connection between the first terminal 311 and the third terminal 313.

The control unit 4 of the second embodiment includes two control modules 41 and 42.

One of the control modules 41 includes a control transistor 412, a diode 415, a control switch 411, a buffer resistor 413 and a dropping resistor 414. The control transistor 412 has a first terminal connected to the first terminal 321 of the switch driver 32, a second terminal connected to the first electrode terminal (IN1), and a control terminal connected to the second electrode terminal (IN2). The diode 415 has an anode end electrically connected to the second terminal of the control transistor 412, and a cathode end electrically connected to the first terminal of the control transistor 412. The control switch 411 has a first terminal 416 electrically connected to the second terminal of the control transistor 412, and a second terminal 417 electrically connected to the control terminal of the control transistor 412. The control switch 411 is configured to be switchable between an open state and a closed state so as to control the control transistor 412 to respectively operate in a conduction mode where electric current is allowed to flow from the first terminal of the control transistor 412 to the second terminal of the control transistor 412, and a non-conduction mode where the electric current is not allowed to flow from the first terminal of the control transistor 412 to the second terminal of the control transistor 412. The buffer resistor 413 is electrically connected between the second electrode terminal (IN2) and the control terminal of the control transistor 412. The dropping resistor 414 is electrically connected between the second electrode terminal (IN2) and the buffer resistor 413.

The other one of the control modules 42 includes another control transistor 422, another diode 425, another control switch 421, another buffer resistor 423 and another dropping resistor 424. Said another control transistor 422 has a first terminal connected to the second terminal 322 of the switch driver 32, a second terminal connected to the second electrode terminal (IN2), and a control terminal connected to the first electrode terminal (IN1). Said another diode 425 has an anode end electrically connected to the second terminal of said another control transistor 422, and a cathode end electrically connected to the first terminal of said another control transistor 422. Said another control switch 421 has a first terminal 426 electrically connected to the second terminal of said another control transistor 422, and a second terminal 427 electrically connected to the control terminal of said another control transistor 422. Said another control switch 421 is configured to be switchable between an open state and a closed state so as to control said another control transistor 422 to respectively operate in a conduction mode where electric current is allowed to flow from the first terminal of said another control transistor 422 to the second terminal of said another control transistor 422, and a non-conduction mode where the electric current is not allowed to flow from the first terminal of said another control transistor 422 to the second terminal of said another control transistor 422. Said another buffer resistor 423 is electrically connected between the first electrode terminal (IN1) and the control terminal of said another control transistor 422. Said another dropping resistor 424 is electrically connected between the first electrode terminal (IN1) and said another buffer resistor 423.

Like what is disclosed in the first embodiment of the DC motor controller, each of the control switch 411 and said another control switch 421 may be controlled by an external control circuit (not shown), and may be implemented by, but is not limited to, a limit switch such as a micro limit switch, a reed limit switch, an optoelectronic limit switch, a thermal limit switch or a vibration limit switch.

Similarly, in this embodiment, each of the control transistor 412 and said another control transistor 422 is implemented by an NPN-type BJT. For each of the control transistor 412 and said another control transistor 422, the first terminal corresponds to the collector of BJT; the second terminal corresponds to the emitter of BJT; the control terminal corresponds to the base of BJT. However, implementations of the control transistor 412 and said another control transistor 422 are not limited to what is disclosed herein and may vary in other embodiments. For example, each of the control transistor 412 and said another control transistor 422 may be implemented by one of a PNP-type BJT, an N-type MOSFET and a P-type MOSFET, and the wiring of the DC motor controller is adjusted based on the implementations of the control transistor 412 and said another control transistor 422.

The DC motor controller further includes a positioning switch 6 electrically connected between the first electrode terminal (IN1) and the third terminal 313 of the motor switch 31. The positioning switch 6 is configured to be operated between one of a closed state and an open state. The positioning switch 6 may be implemented by a simple electromechanical switch such as a toggle switch or a pushbutton switch, but implementation of the positioning switch 6 is not limited to the disclosure herein and may vary in other embodiments. For example, the positioning switch 6 may be implemented by an electronic switch to be controlled by an external control circuit.

For normal use of this embodiment of the DC motor controller, the polarity of the DC electric power source may be operated to switch between one of a positive configuration and a negative configuration based on demand. For the positive configuration, the first electrode terminal (IN1) is applied with a higher electric potential (positive pole) than that applied to the second electrode terminal (IN2) (negative pole). For the negative configuration, the first electrode terminal (IN1) is applied with a lower electric potential (negative pole) than that applied to the second electrode terminal (IN2) (positive pole). In this embodiment, the DC motor 9 is operated to rotate in a forward direction for driving the electric cylinder to extend, by switching the DC electric power source to the positive configuration. Oppositely, the DC motor 9 is operated to rotate in a reverse direction for driving the electric cylinder 9 to retract, by switching the DC electric power source to the negative configuration. An example where each of the control switch 411 and said another control switch 421 is implemented by a limit switch is described in the following for detailed explanation.

In the case that the control switch 411 and said another control switch 421 are both in the open state, in order to extend the electric cylinder, the DC electric power source is switched to the positive configuration, causing the control transistor 412 to switch to the non-conduction mode and said another control transistor 422 to switch to the conduction mode. Therefore, an electric current flows from the first electrode terminal (IN1), through the diode 415, the inductor 323 of the switch driver 32, and said another control transistor 422, and to the second electrode terminal (IN2), in the given order. Electric current flowing through the inductor 323 of the switch driver 32 causes the motor switch 31 to switch to the first state, enabling the electric current to flow from the first electrode terminal (IN1), through the DC motor 9, and to the second electrode terminal (IN2). In this way, the DC motor 9 rotates in the forward direction and drives the electric cylinder to extend.

However, when the electric cylinder reaches an upper limit position by extension, said another control switch 421 is triggered to switch to the closed state. Lacking sufficient positive electric potential difference from the control terminal to the second terminal of said another control transistor 422, said another control transistor 422 is switched to the non-conduction mode. Therefore, the electric current stops flowing through the inductor 323 of the switch driver 32, causing the motor switch 31 to be switched to the second state to terminate the supply of the electric current to the DC motor 9. Hence, the DC motor 9 stops operating to drive the electric cylinder, limiting the extension of the electric cylinder to the upper limit position.

In the case that the control switch 411 and said another control switch 421 are both in the open state, in order to retract the electric cylinder, the DC electric power source is switched to the negative configuration, causing the control transistor 412 to switch to the conduction mode and said another control transistor 422 to switch to the non-conduction mode. Therefore, an electric current flows from the second electrode terminal (IN2), through said another diode 425, the inductor 323 of the switch driver 32, and the control transistor 412, and to the first electrode terminal (IN1) in the given order. Electric current flowing through the inductor 323 of the switch driver 32 causes the motor switch 31 to switch to the first state, enabling the electric current to flow from the second electrode terminal (IN2), through the DC motor 9, and to the first electrode terminal (IN1). In this way, the DC motor 9 rotates in the reverse direction and drives the electric cylinder to retract.

However, when the electric cylinder reaches a lower limit position due to retraction, the control switch 411 is triggered to switch to the closed state. Lacking sufficient positive electric potential difference from the control terminal to the second terminal of the control transistor 412, the control transistor 412 is switched to the non-conduction mode. Therefore, the electric current stops flowing through the inductor 323 of the switch driver 32, causing the motor switch 31 to be switched to the second state to terminate the supply of the electric current to the DC motor 9. Hence, the DC motor 9 stops operating to drive the electric cylinder, limiting the retraction of the electric cylinder to the lower limit position.

When the motor switch 31 is switched to the second state whether by the aforementioned mechanisms, by manual operation, or by control from the external control circuit, switching the positioning switch 6 to the closed state causes the DC motor 9 to refrain from operating (i.e., the DC motor 9 is short-circuited and is in the self-locking mode), and hence the electric cylinder cannot be driven to extend or retract by external force. In other words, the electric cylinder can be locked at the upper limit position, the lower limit position, or any desired position. A problem that the electric cylinder is prone to being extended or retracted under the influence of external force when the electric cylinder is implemented with a ball screw may be alleviated. Moreover, conventional approaches for solving the aforementioned problem may utilize an electromagnetic switch or a mechanical device (e.g., a clutch) to prevent the electric cylinder from being extended or retracted by external force, but such conventional approaches are unfavorable due to excessive dimensions of these devices. In contrast, miniaturization of the DC motor controller of this disclosure may be realized because only the position switch 6 is needed to achieve the effect of locking the electric cylinder at the desired position.

Consequently, based on the length the electric cylinder extends or retracts (i.e., whether the upper or lower limit position is reached), or based on determination made by an external control circuit regarding whether the DC motor is overheated, whether a predetermined time has elapsed, or whether abnormal operation has occurred, the two control modules 41 and 42 are able to control the DC motor 9 to stop rotating in the forward or reverse direction so as to keep the electric cylinder from extending or retracting.

Referring to FIG. 4, a third embodiment of the DC motor controller is illustrated. The third embodiment of the DC motor controller is similar to the second embodiment, but is different in what are disclosed as follows.

The DC motor controller of the third embodiment further includes two overload protection modules 51 and 52.

One of the overload protection modules 51 is electrically connected between the first electrode terminal (IN1) and the DC motor 9. Said one of the overload protection modules 51 is configured to detect the DC electric current conducted to the DC motor 9, and to control the control transistor 412 to operate in the non-conduction mode when it is determined that the DC motor 9 is overloaded according to the DC electric current thus detected. Said one of the overload protection modules 51 includes a detecting element 511, a silicon controlled rectifier (SCR) 512, a dropping resistor 513 and a stabilizing capacitor 514.

The detecting element 511 is to be electrically connected between the first electrode terminal (IN1) and the DC motor 9. The detecting element 511 is configured to detect the DC electric current conducted to the DC motor 9, and to output a control signal. In this embodiment, the detecting element 511 is implemented by but not limited to a resistor.

The silicon controlled rectifier (SCR) 512 has an anode end electrically connected to the control terminal of the control transistor 412, a cathode end electrically connected to the first electrode terminal (IN1), and a gate end configured to receive the control signal so as to be switched between one of a conduction mode and a non-conduction mode based on the control signal.

The dropping resistor 513 is electrically connected between the detecting element 511 and the gate end of the SCR 512.

The stabilizing capacitor 514 is electrically connected between the first electrode terminal (IN1) and the gate end of the SCR 512.

The other one of the overload protection modules 52 is electrically connected between the second electrode terminal (IN2) and the DC motor 9. The other one of the overload protection modules 52 is configured to detect the DC electric current conducted to the DC motor 9, and to control said another control transistor 422 to operate in the non-conduction mode when it is determined that the DC motor 9 is overloaded according to the DC electric current thus detected. Said the other one of the overload protection modules 52 includes another detecting element 521, another SCR 522, another dropping resistor 523 and another stabilizing capacitor 524.

Said another detecting element 521 is to be electrically connected between the second electrode terminal (IN2) and the DC motor 9. Said another detecting element 521 is configured to detect the DC electric current conducted to the DC motor 9, and to output another control signal. In this embodiment, said another detecting element 521 is implemented by but not limited to a resistor.

Said another SCR 522 has an anode end electrically connected to the control terminal of said another control transistor 422, a cathode end electrically connected to the second electrode terminal (IN2), and a gate end configured to receive said another control signal so as to be switched between one of a conduction mode and a non-conduction mode based on said another control signal.

Said another dropping resistor 523 is electrically connected between said another detecting element 521 and the gate end of said another SCR 522.

Said another stabilizing capacitor 524 is electrically connected between the second electrode terminal (IN2) and the gate end of said another SCR 522.

Similar to the second embodiment, for normal use of this embodiment of the DC motor controller, the polarity of the DC electric power source may be operated to switch between one of the positive configuration and the negative configuration based on demand. In this embodiment, the DC motor 9 is operated to rotate in the forward direction for driving the electric cylinder to extend, by switching the DC electric power source to the positive configuration. Oppositely, the DC motor 9 is operated to rotate in the reverse direction for driving the electric cylinder 9 to retract, by switching the DC electric power source to the negative configuration. An example is described in the following for detailed explanation. It should be noted that since functions of the control unit 4 of the third embodiment are similar to those described in the second embodiment, details of operation of the control unit 4 of the third embodiment will be omitted herein for the sake of brevity.

In the case that the DC electric power source is switched to the negative configuration, an electric current flows from the second electrode terminal (IN2), through said another detecting element 521, the DC motor 9 and the detecting element 511, and to the first electrode terminal (IN1) in the given order. When the electric current is abnormally large, the detecting signal outputted by the detecting element 511 will exceed a threshold voltage value of the SCR 512, causing the SCR 512 to switch to the conduction mode to conduct electric current between the cathode end and the anode end of the SCR 512. Consequently, positive electric potential difference from the control terminal to the second terminal of the control transistor 412 is reduced, causing the control transistor 412 to switch to the non-conduction mode. Therefore, the electric current stops flowing through the inductor 323 of the switch driver 32, causing the motor switch 31 to switch to the second state to terminate the supply of the electric current to the DC motor 9. Hence, the DC motor 9 stops operating to drive the electric cylinder.

Likewise, in the case that the DC electric power source is switched to the positive configuration, an electric current flows from the first electrode terminal (IN1), through the detecting element 511, the DC motor 9 and said another detecting element 521, and to the second electrode terminal (IN2) in the given order. When the electric current is abnormally large, said another detecting signal outputted by said another detecting element 521 will exceed a threshold voltage value of said another SCR 522, causing said another SCR 522 to switch to the conduction mode to conduct electric current between the cathode end and the anode end of said another SCR 522. As a result, positive electric potential difference from the control terminal to the second terminal of said another control transistor 422 is reduced, causing said another control transistor 422 to switch to the non-conduction mode. Therefore, the electric current stops flowing through the inductor 323 of the switch driver 32, causing the motor switch 31 to switch to the second state to terminate the supply of the electric current to the DC motor 9. Hence, the DC motor 9 stops operating to drive the electric cylinder.

Therefore, the two overload protection modules 51 and 52 arm the DC motor controller with an overload protection capability when the DC motor 9 is rotating in the forward and reverse directions, respectively, so as to prevent the DC motor controller and the DC motor 9 from overheating and the associated damage caused by an abnormally large electric current and potentially shortening service life of the DC motor controller or the DC motor 9.

Furthermore, when operation of the electric cylinder is obstructed and the electric cylinder is unable to be driven by the DC motor 9 to further extend or retract, idling of the DC motor 9 may result in an abnormally large current which is to be detected by one of the two overload protection modules 51 and 52 that triggers overload protection as previously described. Therefore, one of the two control transistors 412 and 422 is switched into the non-conduction mode, causing the motor switch 31 to switch to the second state to terminate the supply of the electric current to the DC motor 9. Hence, the DC motor 9 stops operating to drive the electric cylinder.

Additionally, by virtue of characteristic of the SCR that once switched on, the SCR will be latched, i.e., be kept in the conduction mode until being reset, one of the control transistors 412 and 422 may be forced to be switched to the non-conduction mode when the motor 9 is overloaded, stopping the motor 9 from operation. Moreover, implementing the DC motor controller with SCRs increases stability of operation, simplifies manufacturing procedures, and reduces manufacturing cost of the DC motor controller.

In summary, the DC motor controller of this disclosure utilizes the control unit 4 to control switching of the motor switch 31, so as to control the DC motor to stop rotating. In addition, the DC motor controller of this disclosure utilizes the position switch 6 to cause the DC motor 9 to self-lock after the DC motor 9 has been stopped. Furthermore, the DC motor controller of this disclosure utilizes the overload protection modules 51, 52 to realize overload protection.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A direct current (DC) motor controller adapted to control a DC motor, said DC motor controller comprising:
   a first electrode terminal and a second electrode terminal connected to a DC electric power source, and cooperatively conducting DC electric current from the DC electric power source to the DC motor;
   a motor switch unit including
      a motor switch that has a first terminal connected to the DC motor, and a second terminal connected to said second electrode terminal, and that is switchable between a first state where the DC electric current is conducted to the DC motor for operation of the DC motor, and a second state where the DC electric current is not conducted to the DC motor; and
   a control unit electrically connected between said first electrode terminal and said second electrode terminal, and controlling said motor switch unit by operating said motor switch of said motor switch unit to switch between the first state and the second state,
   wherein said control unit and the DC motor are not connected in series, so a high electric current flowing through the DC motor does not flow through said control unit;
   wherein said motor switch unit further includes a switch driver that has a first terminal and a second terminal which is connected to said second electrode terminal; and
   wherein said control unit includes a control module including
      a control transistor that has a first terminal connected to the first terminal of said switch driver, a second terminal connected to said first electrode terminal, and a control terminal connected to said second electrode terminal, and
      a control switch that has a first terminal electrically connected to the second terminal of said control transistor, and a second terminal electrically connected to the control terminal of said control transistor, and that is switchable between an open state for controlling said control transistor to operate in a conduction mode where said motor switch is triggered by said switch driver to switch to the first state, and a closed state for controlling said control transistor to operate in a non-conduction mode where said motor switch is triggered by said switch driver to switch to the second state.

2. The DC motor controller as claimed in claim 1, further comprising an overload protection module that is electrically connected between said first electrode terminal and the DC motor, and that is configured to detect the DC electric current conducted to the DC motor, and to control said control transistor to operate in the non-conduction mode when it is determined that the DC motor is overloaded according to the DC electric current thus detected.

3. The DC motor controller as claimed in claim 1, wherein said switch driver includes an inductor.

4. The DC motor controller as claimed in claim 2, wherein said overload protection module includes:
a detecting element that is to be electrically connected between said first electrode terminal and the DC motor, and that is configured to detect the DC electric current conducted to the DC motor, and to output a control signal; and
a silicon controlled rectifier (SCR) that has an anode end electrically connected to the control terminal of said control transistor, a cathode end electrically connected to said first electrode terminal, and a gate end configured to receive the control signal.

5. A direct current (DC) motor controller adapted to control a DC motor, said DC motor controller comprising:
a first electrode terminal and a second electrode terminal connected to a DC electric power source, and cooperatively conducting DC electric current from the DC electric power source to the DC motor;
a motor switch unit including
a motor switch that has a first terminal connected to the DC motor, and a second terminal connected to said second electrode terminal, and that is switchable between a first state where the DC electric current is conducted to the DC motor for operation of the DC motor, and a second state where the DC electric current is not conducted to the DC motor; and
a control unit electrically connected between said first electrode terminal and said second electrode terminal, and controlling said motor switch unit by operating said motor switch of said motor switch unit to switch between the first state and the second state,
wherein said control unit and the DC motor are not connected in series, so a high electric current flowing through the DC motor does not flow through said control unit;
wherein said motor switch unit further includes a switch driver that has a first terminal and a second terminal, and that is configured to trigger said motor switch of said motor switch unit to switch to the first state when there is electric current flowing between the first terminal and the second terminal of said switch driver, and to switch to the second state when no electric current flows between the first terminal and the second terminal of said switch driver; and
wherein said control unit includes two control modules, one of said control modules including
a control transistor which has a first terminal connected to the first terminal of said switch driver, a second terminal connected to said first electrode terminal, and a control terminal connected to said second electrode terminal,
a diode which has an anode end electrically connected to the second terminal of said control transistor, and a cathode end electrically connected to the first terminal of said control transistor, and
a control switch which has a first terminal electrically connected to the second terminal of said control transistor, and a second terminal electrically connected to the control terminal of said control transistor, and which is switchable between an open state and a closed state to control said control transistor to respectively operate in a conduction mode where electric current is allowed to flow from the first terminal of said control transistor to the second terminal of said control transistor, and a non-conduction mode where the electric current is not allowed to flow from the first terminal of said control transistor to the second terminal of said control transistor,
the other one of said control modules including
another control transistor which has a first terminal connected to the second terminal of said switch driver, a second terminal connected to said second electrode terminal, and a control terminal connected to said first electrode terminal,
another diode which has an anode end electrically connected to the second terminal of said another control transistor, and a cathode end electrically connected to the first terminal of said another control transistor, and
another control switch which has a first terminal electrically connected to the second terminal of said another control transistor, and a second terminal electrically connected to the control terminal of said another control transistor, and which is switchable between an open state and a closed state to control said another control transistor to respectively operate in a conduction mode where electric current is allowed to flow from the first terminal of said another control transistor to the second terminal of said another control transistor, and a non-conduction mode where the electric current is not allowed to flow from the first terminal of said another control transistor to the second terminal of said another control transistor.

6. The DC motor controller as claimed in claim 5, further comprising two overload protection modules,
one of said overload protection modules being electrically connected between said first electrode terminal and the DC motor, and being configured to detect the DC electric current conducted to the DC motor, and to control said control transistor to operate in the non-conduction mode when it is determined that the DC motor is overloaded according to the DC electric current thus detected, and
the other one of said overload protection modules being electrically connected between said second electrode terminal and the DC motor, and being configured to detect the DC electric current conducted to the DC motor, and to control said another control transistor to operate in the non-conduction mode when it is determined that the DC motor is overloaded according to the DC electric current thus detected.

7. The DC motor controller as claimed in claim 5, wherein:

said motor switch further has a third terminal, and is configured to, when said motor switch is in the first state, establish an electrical connection between the first terminal and the second terminal, and to, when said motor switch is in the second state, establish an electrical connection between the first terminal and the third terminal; and said DC motor controller further comprises a positioning switch electrically connected between said first electrode terminal and the third terminal of said motor switch.

8. The DC motor controller as claimed in claim 5, wherein said motor switch unit is a relay switch.

9. The DC motor controller as claimed in claim 6, wherein:

said one of said overload protection modules includes a detecting element that is to be electrically connected between said first electrode terminal and the DC motor, and that is configured to detect the DC electric current conducted to the DC motor, and to output a control signal, and a silicon controlled rectifier (SCR) that has an anode end electrically connected to the control terminal of said control transistor, a cathode end electrically connected to said first electrode terminal, and a gate end configured to receive the control signal; and said the other one of said overload protection modules includes another detecting element that is to be electrically connected between said second electrode terminal and the DC motor, and that is configured to detect the DC electric current conducted to the DC motor, and to output another control signal, and another SCR that has an anode end electrically connected to the control terminal of said another control transistor, a cathode end electrically connected to said second electrode terminal, and a gate end configured to receive said another control signal.

* * * * *